US012706802B2

(12) United States Patent
Cumin et al.

(10) Patent No.: US 12,706,802 B2
(45) Date of Patent: Aug. 11, 2026

(54) METHOD AND DEVICE FOR TRANSMITTING INFORMATION ON THE CONFIGURATION OF AN ENVIRONMENT

(71) Applicant: Orange, Issy-les-Moulineaux (FR)

(72) Inventors: Julien Cumin, Chatillon Cedex (FR); Fano Ramparany, Chatillon Cedex (FR); Frédéric Bour, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/190,827

(22) Filed: Mar. 27, 2023

(65) Prior Publication Data

US 2023/0318912 A1 Oct. 5, 2023

(30) Foreign Application Priority Data

Mar. 31, 2022 (FR) ...................................... 2202958

(51) Int. Cl.
*H04L 41/0803* (2022.01)
*H04L 41/50* (2022.01)
(Continued)

(52) U.S. Cl.
CPC .......... *H04L 41/0803* (2013.01); *H04L 41/50* (2013.01); *H04L 12/2807* (2013.01); *H04L 67/12* (2013.01)

(58) Field of Classification Search
CPC ..... H04L 41/0803; H04L 41/50; H04L 67/12; H04L 67/125; H04L 65/102; H04L 12/2807
(Continued)

(56) References Cited

U.S. PATENT DOCUMENTS

2012/0289147 A1* 11/2012 Raleigh ............ H04N 21/25808 455/3.06
2014/0343891 A1* 11/2014 Becker .................. G08G 1/147 702/150

(Continued)

FOREIGN PATENT DOCUMENTS

EP 3043585 A1 7/2016
WO WO 2020/120977 A2 6/2020

OTHER PUBLICATIONS

French Search Report dated Nov. 11. 2022 for Application No. FR 2202958.

*Primary Examiner* — Jungwon Chang
(74) *Attorney, Agent, or Firm* — Knobbe, Martens, Olson & Bear, LLP

(57) ABSTRACT

A method and a device for transmitting information on the configuration of an environment comprising at least one first connected object and implementing at least one first service accessible through a first communication interface are described. The method is implemented by a computer and includes the determination of an operation of at least one second connected object or of the implementation of at least one second service accessible through at least one second communication interface different from the first communication interface, and the transmission to the first communication interface of information on the configuration of the environment accessible by the first communication interface as a function of the operation of the at least second connected object or of the implementation of the at least second service.

18 Claims, 4 Drawing Sheets

(51) Int. Cl.
*H04L 12/28* (2006.01)
*H04L 67/12* (2022.01)

(58) Field of Classification Search
USPC .......................................... 370/338; 709/220
See application file for complete search history.

(56) References Cited

U.S. PATENT DOCUMENTS

| | | | | |
|---|---|---|---|---|
| 2015/0058148 | A1* | 2/2015 | Grosz | G06Q 30/0269 705/26.2 |
| 2016/0134932 | A1 | 5/2016 | Karp et al. | |
| 2016/0295429 | A1* | 10/2016 | Enqvist | H04W 4/18 |
| 2016/0381631 | A1* | 12/2016 | Cholas | H04W 76/10 370/338 |
| 2018/0054850 | A1* | 2/2018 | Leonelli | H04L 67/125 |
| 2018/0234266 | A1* | 8/2018 | Rudolph | H04L 67/12 |
| 2022/0124548 | A1* | 4/2022 | Srivastava | H04W 28/0268 |
| 2022/0166635 | A1* | 5/2022 | Mohan | H04L 9/3268 |
| 2022/0167164 | A1* | 5/2022 | Xu | H04W 60/04 |
| 2025/0213095 | A1* | 7/2025 | Budampati | A47L 15/0049 |

* cited by examiner

[Fig. 1]
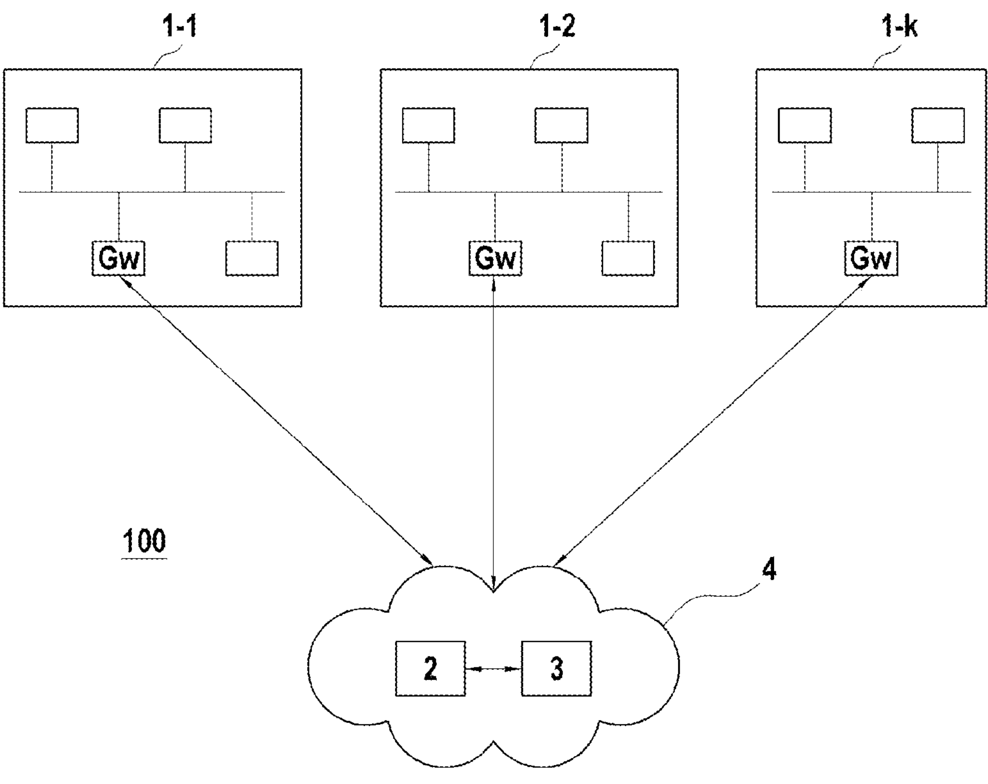
[Fig. 2]
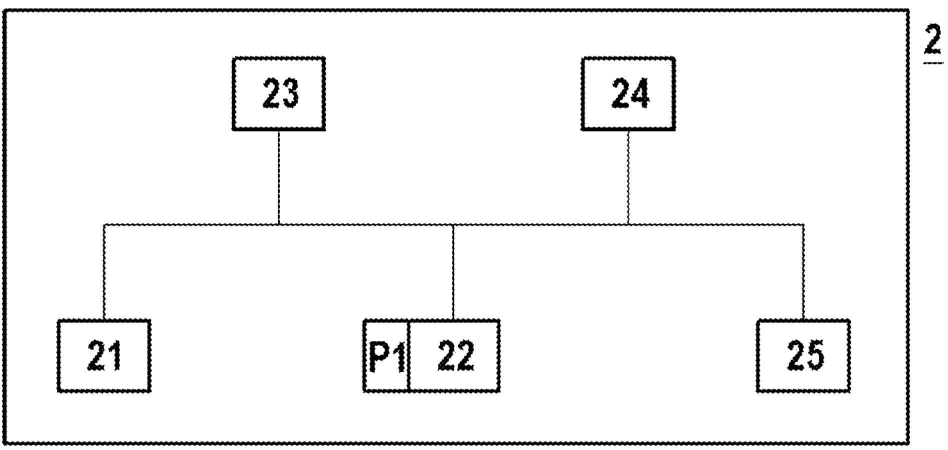

[Fig. 3]
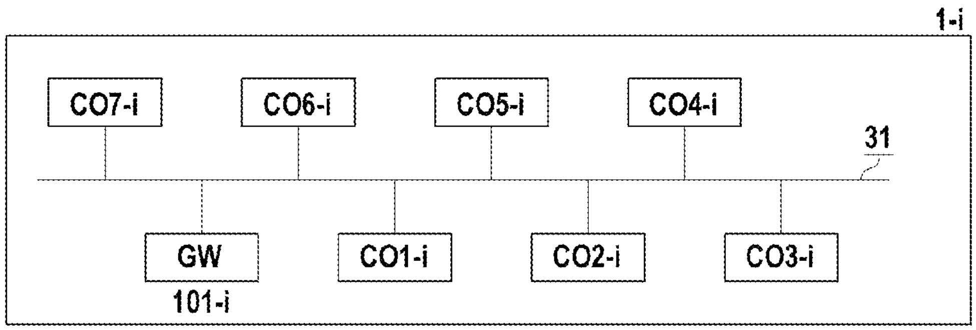
[Fig. 5]
GROUP 1
| ID | NUMBER | D |
|---|---|---|
| $S_1$ | 3 | 5 |
| $S_2$ | 4 | 7 |
| $S_3$ | 10 | 5 |
| ⋮ | | |
| $S_m$ | 8 | 4 |
| $O_1$ | 12 | 10 |
| $O_2$ | 19 | 16 |
| ⋮ | | |
| $O_m$ | 23 | 18 |
GROUP 2
| ID | NUMBER | D |
|---|---|---|
| $S_1$ | 4 | 8 |
| $S_2$ | 5 | 9 |
| $S_3$ | 15 | 6 |
| ⋮ | | |
| $S_m$ | 9 | 8 |
| $O_1$ | 18 | 9 |
| $O_2$ | 25 | 10 |
| ⋮ | | |
| $O_m$ | 24 | 12 |
GROUP 3
| ID | NUMBER | D |
|---|---|---|
| $S_1$ | 7 | 8 |
| $S_2$ | 8 | 10 |
| $S_3$ | 12 | 8 |
| ⋮ | | |
| $S_m$ | 13 | 6 |
| $O_1$ | 16 | 20 |
| $O_2$ | 20 | 21 |
| ⋮ | | |
| $O_m$ | 19 | 13 |

[FIG. 4]
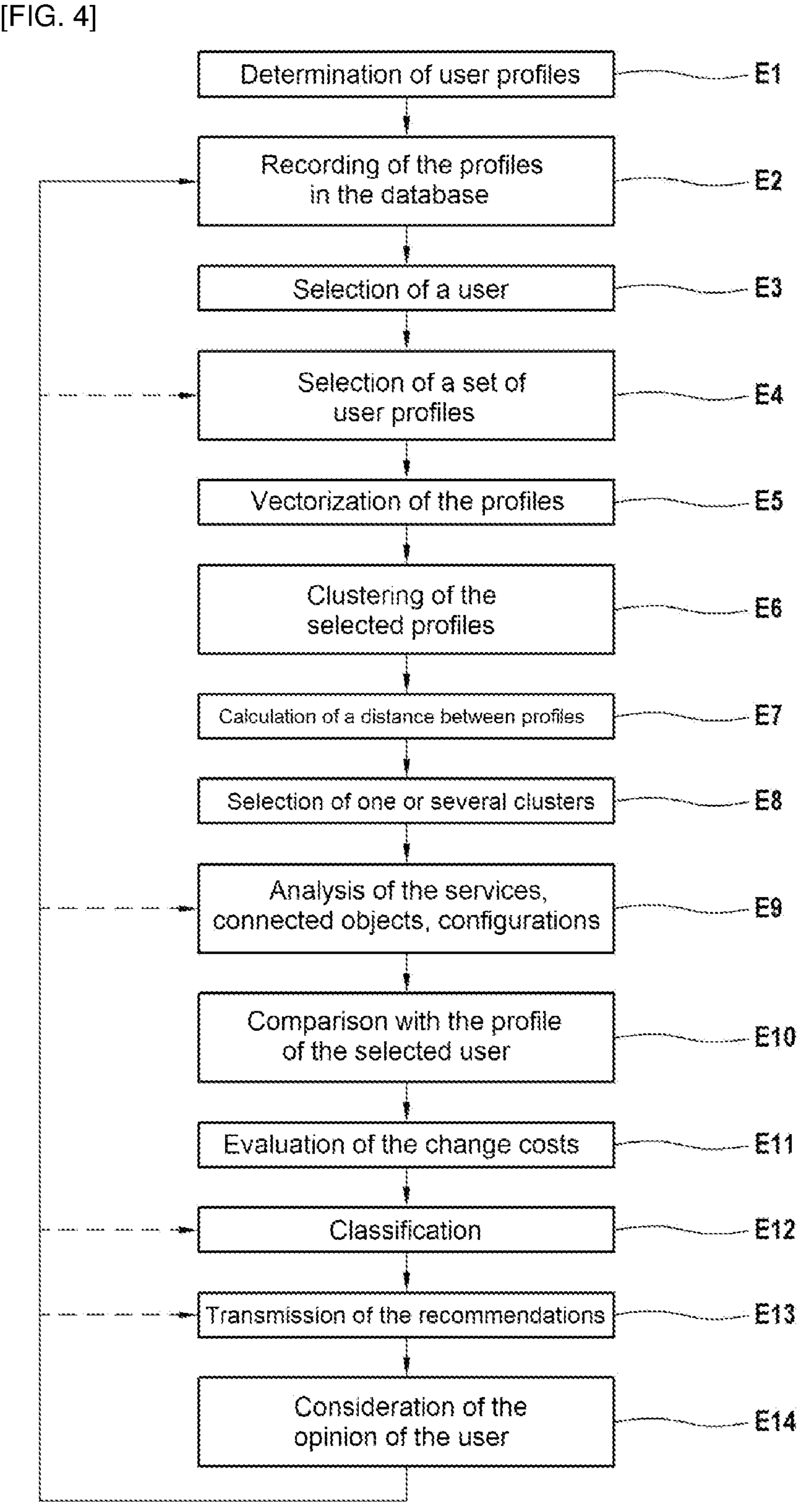

[FIG.6]

GROUPS 1+2+3

| ID | NUMBER | D |
|---|---|---|
| $S_1$ | 14 | 21 |
| $S_2$ | 17 | 26 |
| $S_3$ | 37 | 29 |
| ⋮ | | |
| $S_m$ | 30 | 18 |
| $O_1$ | 46 | 39 |
| $O_2$ | 64 | 47 |
| ⋮ | | |
| $O_m$ | 66 | 43 |

TARGET USER DATA

| ID | D | REFUSAL |
|---|---|---|
| $S_1$ | 0 | YES |
| $S_2$ | 3 | NO |
| $S_3$ | 0 | NO |
| ⋮ | | |
| $S_m$ | 25 | NO |
| $O_1$ | 0 | NO |
| $O_2$ | 0 | NO |
| ⋮ | | |
| $O_m$ | 0 | NO |

[FIG.7]

COST DATA

| OFFER | COST |
|---|---|
| $S_3$ | 100 |
| $S_3+O_2$ | 150 |
| $S_3+O_3$ | 200 |
| $S_m$ | 200 |
| $S_n+O_m$ | 220 |
| ⋮ | |

METHOD AND DEVICE FOR TRANSMITTING INFORMATION ON THE CONFIGURATION OF AN ENVIRONMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to French Patent Application No. 2202958, filed Mar. 31, 2022, the disclosure of which is hereby incorporated by reference in its entirety.

BACKGROUND

Technical Field

Embodiments of the disclosed technology relate to the field of the configuration of connected objects in a user environment, particularly but without limitation, in an smart environment such as a connected home.

Description of the Related Art

Today, the service operators provide and deploy many services to their subscribers. In addition to the services, the operators also propose many connected objects able or unable to implement these services or some of these services. In addition, these connected objects can be configured in different ways, by modifying some of their configuration parameters, to operate a particular service. It should also be noted that some services can exist without connected objects, some connected objects can operate without the subscription to a service and some configurations can operate an object with zero, one or several services. Thus, it becomes complex, both for the user and for the operator, to know whether the user uses the services, the connected objects and the configurations of the connected objects that suit him best. It is therefore possible that a user, depending on his profile, does not take full advantage of his subscription and could claim the use of additional services, the use of complementary connected objects or simply the use of the connected objects at his disposal differently by modifying their configuration.

There is therefore a need to improve the environment of a user in terms of connected objects and services and to improve the configuration of these services and connected objects. In other words, there is a need to effectively operate a technical system including one or several connected objects.

SUMMARY

The present disclosure proposes a method for transmitting information on the configuration of an environment comprising at least one first connected object and implementing at least one first service accessible through a communication interface, said method being implemented by a computer and comprising:

the determination of an operation of at least one second connected object or of the implementation of at least one second service accessible through at least one second communication interface different from the first communication interface, the transmission to said first communication interface of information on the configuration of said environment accessible by said first communication interface as a function of the operation of said at least second connected object or of the implementation of said at least second service.

Thus, advantageously, a user connected to the first gateway can be offered a new configuration of his environment as a function of the operation of another connected object associated with another communication interface or as a function of the implementation of a service associated with another communication interface. By the operation of a connected object or the implementation of a service, it is meant here the use of an object or of a service and not the simple possession. Using information relating to the operation or to the implementation advantageously allows not only taking into account the possession of a connected object but also the fact that this connected object is actually used or that the service is used. This can make the transmitted configuration information more relevant. Thus, the disclosed technology can allow effectively operating a technical system including one or several connected objects. The content of the configuration information therefore concerns the state of a technical system allowing this system or technical environment to be correctly operated. The transmitted configuration information can thus allow configuring a connected object in a different way and more particularly in an operating mode that would be more adapted to the user, the same applies to a service.

By the determination of the operation of an object, it is meant the determination that this object is used, in other words the determination of the use of an object. This is opposed to the determination of the possession of an object.

According to one preferred embodiment, the determination of the operation of a second connected object takes into account an operating time or a use frequency of the connected object.

Thus, a frequently used object is advantageously taken into account to determine the operation of a second connected object and more than a less used object. Rather than the use time, it is also relevant to consider the use frequency. Indeed, some objects can be used often but for a short time, and the vice versa for others. The operating time and the use frequency are characteristics that can advantageously represent the operation/the use of a connected object or a service.

According to one preferred embodiment, the at least one first and the at least one second connected objects are associated with at least one configuration, the determination of the operation of a second connected object takes into account an operating time or a use frequency of the object associated with at least one of the configurations.

The connected objects, as smart objects, can be advantageously configured for different uses and thus operate with different services or autonomously. It is therefore particularly advantageous that not only the use of a connected object but also its use in the different configurations is taken into account.

Preferably the at least one first and the at least one second connected objects configured in at least one of said configurations are accessible by the subscription to at least one service, or in which at least one service can be subscribed via respectively the first or second access communication interfaces, the determination of the operation of a second connected object taking into account an operating time or a use frequency associated with the subscribed services.

By taking into account the subscribed services, the users of the access communication interfaces may also be offered configurations more adapted to their profile.

Preferably, the method comprises the determination of a profile associated with the first gateway and the determination of a profile associated with the at least one second gateway, the determination of the profile taking into account:

the connected objects that are connected to the gateway,
the configuration of the connected objects,
the subscribed services,
an operating time or a use frequency associated with the subscribed services and/or an operating time or a use frequency of the connected objects associated with at least one of the configurations of the objects.

Preferably, the method comprises the determination of a profile associated with the first communication interface and the determination of a profile associated with the at least one second communication interface, the determination of the profile taking into account:

the connected objects which are connected to the communication interface,
the configuration of the connected objects,
the subscribed services,
an operating time or a use frequency associated with the subscribed services and/or an operating time or a use frequency of the connected objects associated with at least one of the configurations of the objects.

According to one preferred embodiment, the method comprises:

the clustering, into several clusters, of the profiles associated with the second communication interfaces, the clustering being based on a similarity between the profiles,
the obtaining of a distance between the profile associated with said first gateway and a profile representative of at least one clustering,
the configuration information taking into account the profile representative of the at least one clustering as a function of the distance.

According to one preferred embodiment, the method further comprises the selection of one or several clusterings of profiles, the selection consisting in selecting the profile(s) whose distance with the profile of the first gateway is the smallest, the modification information taking into account the profile of the communication interfaces of at least the selected clusterings.

According to one preferred embodiment, the method further comprises a classification, for the clusterings of selected profiles, of the connected objects in operation, of the subscribed services, of the configuration used for the connected object in operation, the connected objects being associated with a type of connected object, said classification being based on either or several of:

the number of communication interfaces each connected to one of the types of connected objects or the number of communication interfaces for which at least one of the services is subscribed,
the operating time or the use frequency of the service or of the type of connected object in one of said configurations,
the classification not comprising the types of connected objects used in the operating configurations accessible by the first communication interface, nor said subscribed services accessible by the first communication interface.

According to one preferred embodiment, the method comprises, for at least one determined number of subscribed services and/or types of connected objects present in the classification, the determination of a cost associated with the implementation of the services or the types of connected objects in the configurations.

According to one preferred embodiment, the configuration information comprises a list of services and/or types of connected objects and associated configurations selected according to the determined cost.

The present disclosure also relates to a device for transmitting information on the configuration of at least one connected object accessible through a first communication interface, the device comprising one or several processors configured to:

determine an operation of at least one other connected object accessible through at least one second access gateway different from the first access gateway,
transmit, to the first access gateway, information on the configuration of at least one connected object accessible by the first access gateway as a function of the operation.

According to another aspect, the present disclosure also relates to a computer program comprising instructions for the execution of the steps of the method according to the present disclosure when the program is executed by a computer.

In yet another aspect, the present disclosure relates to a computer-readable recording medium on which is recorded a computer program comprising instructions for the execution of the steps of the transmission method according to the present disclosure.

According to yet another aspect, embodiments of the disclosed technology relate to a method for recommending a modification of an environment of a first user, said environment comprising at least one first connected object accessible through a first access gateway, said method being implemented by a computer and comprising:

the determination of an operation of at least one second connected object accessible through at least one second access gateway different from the first access gateway,
the recommendation to said first access gateway to modify the configuration of said environment accessible by said first gateway as a function of said operation.

According to yet another aspect, embodiments of the disclosed technology relate to a device for transmitting information on the configuration of an environment comprising at least one first connected object and implementing at least one first service accessible through a first communication interface, said device comprising one or several processors configured to:

determine an operation of at least one other connected object or the implementation of at least one second service accessible through at least one second communication interface different from the first communication interface,
transmit, to said first communication interface, information on the configuration of said environment accessible by said first communication interface as a function of said operation of said at least second connected object or of the implementation of said at least second service.

Embodiments of the disclosed technology also relate to a device for transmitting information on the configuration of an environment comprising at least one first connected object and implementing at least one first service accessible through a first communication interface, said device comprising one or several processors configured to:

determine an operation of at least one other connected object or the implementation of at least one second service accessible through at least one second communication interface different from the first communication interface, transmit, to said first communication interface, information on the configuration of said environment accessible by said first communication interface as a function of said operation of said at least second connected object or of the implementation of said at least second service.

Embodiments of the disclosed technology also relate to an access gateway for connecting a first system to a service operator, the first system comprising at least one first connected object (COx-i) and implementing at least one first service, said service operator being connected to at least one second system through a second access gateway, said second system comprising at least one second connected object and implementing at least one second service, said access gateway being configured to receive, from said service operator, at least one information on the configuration of said first system, said configuration information being determined as a function of the operation of said at least second connected object or of the implementation of said at least second service in said second system.

Embodiments of the disclosed technology also relate to a connected object in a system comprising one or several connected objects, an access gateway and implementing at least one first service, said system being connected to a service operator through said first gateway access, said service operator being connected to at least one second system through a second access gateway, said second system comprising at least one second connected object and implementing at least one second service, said connected object is configured to receive, from said service operator, through said first access gateway, at least one configuration information, said configuration information being determined as a function of the operation of said at least second connected object or of the implementation of said at least second service in said second system.

BRIEF DESCRIPTION OF THE DRAWINGS

Other characteristics and advantages of embodiments of the disclosed technology will become apparent from the description given below, with reference to the appended drawings which illustrate one exemplary embodiment without any limitation.

FIG. 1 represents a system according to one preferred embodiment of the disclosed technology.

FIG. 2 represents a device according to one preferred embodiment of the disclosed technology.

FIG. 3 represents a user environment according to one preferred embodiment of the disclosed technology.

FIG. 4 represents a diagram of a method according to one preferred embodiment of the disclosed technology.

FIG. 5 represents an example of lists associated with selected clusters.

FIG. 6 represents an example of a list, on the left, established from the lists of FIG. 5 and an example of a list, on the right, comprising the list of subscribed services and connected objects in operation in the environment of a target user.

FIG. 7 represents an example of a list ordered according to an incurred cost.

DETAILED DESCRIPTION

FIG. 1 represents a system comprising a set of environments 1-*i* of k users, denoted 1-1 to 1-*k* as well as a server-type device 2 and a database 3.

An environment within the meaning of the present disclosure consists of a set of connected devices or objects that can be configured or parameterized and that can operate with or in collaboration with one or several services subscribed with one or several operators, by a user of this environment. The environment is generally accessible by an operator through an access gateway.

A service is an access to applications, generally software applications, provided by an operator. Examples of services include in particular voice over IP (Internet Protocol) applications, home automation control applications when these services are associated with connected objects, for example, temperature control, video surveillance, opening and closing of the windows, or personal services for example of the medicalized type, or assistance to the elderly.

Each environment 1-1 to 1-*k* is preferably a connected-home type environment but it should be noted that other types of environments can be considered, without limitation, as environments of the office, hospital, school, professional type or the like. More generally, the environments 1-*i* are smart environments in the sense that they comprise communicating devices such as connected objects and can implement services provided by one or several service operators, of the internet type for example. FIG. 3 describes such environments in detail. Such an environment is a technical environment in the sense that it comprises technical means such as connected objects and services conveyed by technical communication protocols. In addition, these equipments are smart equipments and therefore equipped with software and/or hardware means allowing them to communicate with each other and with devices external to the environment.

The server 2 represents a service provider or telephone operator able to deliver to the environments 1-*i* the connection to a communication network and devices able to communicate with each other by means of these communication networks. It is represented here by a server in a computing cloud but this is given for illustrative purposes and it is of course understood that such a service provider comprises an infrastructure comprising a plurality of servers and computing devices connected together and capable of delivering the service to said environments 1-*i* and to said users of these environments. Such a service is generally reserved for users who have taken out a subscription with a service provider, also called subscribers or users indifferently in the following description. The subscribers can subscribe to various services, such as telephony and data services, but also more specific services such as remote monitoring services, heating control services, monitoring services for the elderly, services relating to the connected home generally. Such services can be linked to the presence of connected objects, but this is not always necessary, such services can also only operate on telephones or computers (which can also be considered as connected objects). Such connected objects include, without limitation, window opening sensors, connected light bulbs, television sets, presence detectors, temperature sensors, connected radiators.

The database 3 comprises data relating to the users of the system 100. Indeed, the service provider 4 has both personal information on the subscribers of its service but also information relating to its subscription(s), purchases or rentals of connected objects.

The service provider 4 may be able to know at any time which services are used by each of its subscribers, which connected objects are available to each user, and how each of these connected objects is configured, this for example by the monitoring of the traffic on the service provider's network. According to the present disclosure, the service provider can compare not only what are the services, connected objects and configurations of the objects of other users to offer new services, connected objects or configuration modification to each one or to a user. It can further study the use or the operation of these services and objects and the configurations of the objects when during the use of the services and objects. In addition, the service provider can analyze the use or operation of the services or objects or the configuration of the objects during the use of the services and objects over time so as to make recommendations to the user in a very relevant way. In addition, since the services, the connected objects and the configurations can be linked, in the sense that they can operate together, the service provider does not systematically propose the purchase or the rental of a new service, of a new connected object. It can advantageously be based on the relationship that may exist between service, connected object and configuration to offer the user, via his access gateway, one or several modifications, or a replacement of a connected object with another more relevant connected object. These modifications can be associated with a sale or a rental, therefore monetized but not exclusively since they can also lead to a non-paying modification of the configuration of one or several connected objects to optimize or improve or modify the operation of a service to which the user has already subscribed. In such a case, it can be technical modifications, such as technical parameterizations or physical connection modifications. These modifications can also comprise the replacement of a connected object with another connected object.

The term configuration as understood in the present disclosure can be understood as the parameterization of a connected object when it is associated with a connected object or of a service when it is associated with a service or both. A parameter can for example allow a connected object to implement one service rather than another. The modification of such a parameter for a connected object can also lead to the modification of such a parameter of configuration of a service to take into account this modification of configuration of the connected object.

For example, a configuration of a connected radiator can allow the deactivation of the heating in case of detection of an open window, an anticipation of modification of the temperature delivered according to the weather forecasts, the implementation of a heating profile in the day . . . . Thus, the service associated with the remote temperature/heating control will also undergo a configuration modification to take into account the window opening detection sensor in the control of the heating and stop for example the heating in a room when the window is open.

More generally, the term configuration can be understood as parameterization, parameterization of the configuration, parameterization of the modification of the operation.

By connected object it is meant, in the present disclosure, any object that is capable, in addition to its main function, of sending or receiving information via a telecommunications network. Thus, a computer, a mobile telephone, can be considered as a connected object within the meaning of the present disclosure.

To recommend the use or the commissioning of new services, connected objects or more generally modifications of the environment, the service provider can analyze all the data related to the users registered in the database to obtain a profile of the users. More specifically, the method comprises the determination of the profile associated with an access gateway to which the users are attached. FIG. 4 describes in more detail the determination of such profiles. The recommendations made by the service provider to a user of the environment 1-*i* and transmitted in the form of configuration information are preferably based on the profile related to one or several users.

The profile comprises information on the possession of the connected objects and their configuration as well as on the subscription of services and their configuration.

In addition to the information on the possession and subscription, the profile takes into account information on the use or operation of the connected objects, services and associated configurations.

Taking into account the use or operation allows obtaining a more representative profile and thus offering more relevant recommendations. Indeed, the service provider has access to the data relating to the user's usages and thus has the information not only on the possession of the connected objects and on the subscription to the services but also on their use. This access is done through the information passing through the access gateway. Indeed, whether through the services or the connected objects, the communication network is used to route exchanged information and thus the service provider can know which services and which connected objects are actually used or in operation, at what frequency or for how long. The service provider can therefore know what the configurations of each connected object are and whether it is used or operates in a relevant manner in relation to the services to which the user has subscribed.

For example, if the environment 1-*i* of the user i comprises a connected radiator, and if the user i has subscribed to a remote temperature control service, then if a majority of the users of the database having subscribed to a remote temperature control service uses a connected radiator, a recommendation made to the user i may be to take into account the connected radiator in its configuration by connecting it to the service.

The present disclosure also relates to a method for recommending a modification of an environment of a first user, said environment comprising at least one first connected object (COx-i) and implementing at least one first service accessible through a communication interface (101-*i*), said method being implemented by a computer and comprising:

- the determination of an operation of at least one second connected object or the implementation of at least one second service accessible through at least one second communication interface different from the first communication interface,
- the recommendation to said first communication interface (101-*i*) to modify the configuration of said environment accessible by said first communication interface (101-*i*) as a function of said operation.

According to a first variant, the recommendation can advantageously comprise or consist of the transmission of at least one information on the configuration of said first connected object.

According to a second variant, the recommendation can also comprise the transmission of a list of several modifications of the configuration of said first connected object.

According to a third variant, when said environment also comprises one or several services subscribed by said user, the recommendation can also comprise or consist of the transmission of at least one information on the configuration of said at least one service.

According to a fourth variant, the recommendation comprises the proposal to replace or purchase one or several connected objects, or the proposal to subscribe to or unsubscribe from one or several services.

According to one embodiment, the operation takes into account or comprises an operating time or a use frequency of the connected objects and/or services. This consideration may consist in giving a greater weighting to a connected object and/or to a service accessible by several other access gateways or more frequently used by several other access gateways.

According to one variant, when said connected object or said service is configured according to a given configuration, said operation takes into account an operating time or a use frequency associated with at least the given configuration.

According to yet another variant, when said at least one first and second connected objects configured in the at least one of said configurations are accessible by the subscription to at least one service, said operation takes into account an operating time or a use frequency associated with said subscribed services. This consideration may consist of giving a greater weighting to a service subscribed by a large number of communication interfaces or the more frequently used ones.

In addition to the use or to the operation, the service provider can therefore advantageously take into account the use or the operation over time and/or the use or operating frequency of the service, of the connected objects and of their configuration. Thus, even if a user purchases or rents a connected object, but never or very rarely uses it, then this object will not be among the recommendations made to another user. It is not uncommon for a user to purchase a connected object and realize later that he does not use it, the same applies to a subscribed service.

The environments 1-*i* are connected to the server 2 via one or several networks. These networks are internet-type networks for example or cellular-type networks. For example, this environment is that of a service operator providing Internet services of the data and/or telephone type.

FIG. 2 schematically represents one preferred embodiment of a server 2 able to implement a method according to one embodiment of the present disclosure, typically the method described in FIG. 4.

The server 2 comprises one or several processors 21 implementing a method according to the present disclosure, a read only memory 22 (of the "ROM" type), a rewritable non-volatile memory 23 (of the "EEPROM" or "NAND Flash" type for example), a rewritable volatile memory 24 (of the "RAM" type), a communication interface 25 with the database 3 and with the environments 1-*i*. The read only memory 22 constitutes a recording medium in accordance with one exemplary embodiment of the disclosed technology, readable by the processor(s) 21 and on which a computer program P1 in accordance with one exemplary embodiment of the disclosed technology is recorded. As a variant, the computer program P1 is stored in the rewritable non-volatile memory 23.

The computer program P1 can allow the server 2 to implement at least part of the method in accordance with the present disclosure.

This computer program P1 can thus define functional and software modules, configured to implement the steps of an information transmission method in accordance with one exemplary embodiment of the disclosed technology, or at least part of these steps. These functional modules are based on or control the hardware elements 21, 22, 23, 24, 25 of the server 2 mentioned above.

FIG. 3 represents a user environment 1-*i*.

Such a user environment consists of a set of connected objects communicating with each other via a network 31 and an access point to a second network. The environment 1-*i* comprises one or several connected objects indicated Cox-i communicating with each other through a network 31. According to one embodiment illustrated here but without limitation, the environment 1-*i* comprises in particular a window opening sensor CO1-*i*, a connected television set CO2-*i*, a presence detector CO3-*i*, a connected light bulb CO4-*i*, a connected camera CO5-*i*, a temperature sensor CO6-*i*, a connected radiator CO7-*i*, and possibly other connected objects COx-i. By type of connected object, during the present disclosure, it is meant the nature of the connected object, namely a connected radiator corresponds to a first type and a presence detector corresponds to a second type.

In general, the connected objects are for example household objects such as light bulbs, lamps, radiators or audio and video devices, electricity meters, sprinkler systems, etc. The connected objects communicate with each other via the network 31 which can, without limitation, form part of several categories of networks:

- wired telecommunications networks, belonging to traditional operators that offer high-speed and long-distance connection technologies, subsequently called WAN (Wide Area Network);
- wireless radio networks, themselves divided into different categories:
  - high-speed long-range technologies, of the mobile protocol type (2G, 3G, 4G, etc.), belonging to the long-distance or low-speed telecommunications operators such as LoRa (Long Range Wide-area) or Sigfox (a low-speed cellular network);
  - medium-range technologies of the Z-Wave, Wi-Fi type, etc.,
  - short-range technologies of the NFC (Near Field Communication), bluetooth, BLE, Zigbee type, etc.
- in addition to these radio protocols, some light (Li-Fi) or sound networks, equivalent to wireless protocols, can also be used.

In addition to the communication interface 101-*i* and to the connected objects Cox-i, the user's environment can comprise other devices, connected or not for that matter.

The connected objects Cox-i are, at least for some of them, configurable. If the temperature sensor CO6-*i* is considered, it can be for example configured to operate in relation to the window opening sensor CO1_*i* but it may also not be connected to this sensor. It can also be connected to operate with the connected radiator CO7-*i* and send, for example, a signal that will heat up or stop the connected radiator CO7-*i*.

Similarly, the connected light bulb CO4-*i* can be configured to operate or not with the presence detector. When the presence detector does not detect any presence in a room, the connected light bulb present in this room can be configured to be switched off. This can for example be associated with a time delay.

Similarly, the connected television CO2-*i* can also be configured to be connected for example to the presence detector CO3-*i* to be switched off when the presence detector does not detect any presence in front of the television set or in the room where this connected television set CO2-*i* is located. The volume of the connected television can also be lowered if a user receives a phone call and is in the room where the connected television is located, if the phone is also connected, for example to one of the devices COx-i.

In addition to the connected objects, the environment 1-*i* comprises a communication interface 101-*i* between the various elements of the environment and the remote server.

This communication interface 101-*i* is preferably, but without limitation, an access gateway of the ADSL, VDSL, fiber type allowing the interconnection of the user environment 1-*i* to the service operator 4. Each user may also have subscribed to various services as indicated above and in particular with reference to FIG. 1. Indeed, the communication interface 101-*i* is for example a device of the access gateway type and generally provided by a service operator. Such an operator generally provides the access gateway and a certain number of services to which the user can subscribe, generally with a subscription, often monthly subscription. Thus, in addition to the connected objects, the environment 1-*i* comprises one or several services, which can be used in one or several given configurations.

Among the services proposed, consideration is given, for example, but without limitation, to video on demand (VOD) services, remote surveillance services, shutter opening/closing services, lighting services, energy consumption control services, weather services to access indoor temperature, humidity content analysis, air quality control.

Some of these services can only be implemented if they are associated with one or several connected objects. Some services can be implemented with one or more of these connected objects. Thus, for example, if a user subscribes to a heating control service in his home, like the user of the environment 1-*i*, he can have one or several connected radiators CO7-*i*, he can also have temperature sensors CO6-*i*, window opening sensors CO1-*i*. He may also not benefit from all these equipments, but only part of them, which still allows him to subscribe to the heating control service. For example, like the user of the environment 1-*i*, he may not have door opening sensors and thus the service will not be optimal but will operate partially.

Thus, the user can be offered a new configuration of his environment, by the purchase or the rental of complementary devices to improve his heating control service according to the profile associated with one or several other access gateways connected to other users. The user may be offered in the example above the purchase or the rental of one or several door opening sensors to improve the functionality of the heating control service.

If the user of an environment 1-*i* as represented in FIG. 3 has not subscribed to the heating control service, then according to the present disclosure, he may be offered a modification in the configuration of his environment, and in particular this heating control service in view of the connected devices at his disposal and depending on the use of one or several other users of a heating control service and using the same or some of the same connected objects.

Furthermore, it is also possible that some of these apparatuses, for example the temperature sensor, the door opening detector, are not configured optimally or at least, according to the method disclosed here, can be configured depending on the use by other users.

The present disclosure can propose in this case a modification of the configuration of the connected objects. For example, the heating times can be modified according to the profiles present in the same geographical area. By geographical area, it is possible to define geographical areas having similarities of weather conditions or only of proximity in terms for example of GPS coordinates. It is also possible to take into account profiles that have the same hours of presence at home, the same hours of entry into or exit from the home.

The disclosed method therefore proposes a modification of the configuration of the environment.

FIG. 4 represents one preferred embodiment of implementation of the method according to the present disclosure.

According to this method, during a step E1, the method comprises a step of determining an operation of at least one second connected object or the implementation of at least one second service accessible through the at least one second communication interface, or second access gateway different from the first communication interface or first access gateway.

More specifically, according to one embodiment, the server 2 determines a profile associated with an access gateway associated with a user or associated with a user environment. Subsequently, as in FIG. 4 and for reasons of ease of understanding, this profile can also be referred to as user profile, even if it is associated with an access gateway. A profile is determined for the first access gateway to which configuration information is transmitted and also for one or several other access gateways also called second access gateways. The users connected to the gateways may have taken out a subscription to one or several services and are therefore listed at the level of the server 2. This server 2 may thus have personal type data related to each subscriber and also data called operating or use data.

The personal data include the age, gender, geographical location, family profile, occupation and other information on the subscriber or his family environment.

The operating or use data include the operation or the use of at least one connected object. By operation, it is meant here the use for an object or a service, the implementation for a service and not the mere possession. The operating data are therefore data representative of the fact that an object or a service is used or that a service is implemented. The operating data can take the form of coded information, for example on one bit to indicate that a service is used (for example a "1") or that a service is not used (for example a "0"). The same applies for a connected object.

According to other embodiments, it is possible to note the various services to which the subscriber has subscribed and that he uses, and also to take into account the configurations associated with the connected objects and the services. In this case, for each connected object, one or several bits can each be representative of a configuration and coded as indicated above.

According to one particularly interesting embodiment, the operating time and/or the use frequency of a connected object is taken into account for the determination of the profile. The use time or frequency of a subscribed service can also be taken into account for the determination of the profile. Some connected objects are accessible by the subscription to one or several services. In this case, for each service or each connected object, the operating information is coded on several bits to code the use time or frequency.

Indeed, one of the objectives of the disclosed technology is to offer a subscriber the use that seems most appropriate for him and thus, it is in particular relevant to inform him, for example, that he has subscribed to one or several services but does not use them. In the same way, it may be relevant to inform him that he does not use or that he does not use in the best way, a particular connected object that he rents or has purchased. Thus, it is not only relevant to know the connected objects at his disposal but also their use frequency and their operating time. The method according to the disclosed technology can for example comprise the association with each service or with each connected object, of a weighting related to its use. In one embodiment, the higher the weighting, the longer the service or the connected object is used or the more frequently the service or the connected object is used.

Thus, in order to know whether a subscriber makes the best use of the services and connected objects at his disposal, the method comprises the transmission of the recommendations to the subscriber according to the profile associated with one or several access gateways each associated with one or several users. To this end, the method comprises the transmission of information on the configuration of the first user's environment, namely of at least one connected object and/or of at least one service through the access gateway, called first access gateway, connecting the environment of the user to the server 2. Prior to the transmission, the method can comprise, in one embodiment, the determination of this configuration information. This configuration information is obtained from the operating information obtained previously.

In particular, this configuration information is representative of the operation of one or several connected objects or one or several services and accessible by the second access gateways. This configuration information is representative of the operating data and in particular of the most used objects and/or services accessible by the other access gateways obtained from the profiles. Thus, for example, this configuration information can list per operating time or use frequency each or several of the connected objects and services accessible by the other access gateways listed in the profiles. The configuration information may be a list containing a selection of the most frequently used or the longest used x connected objects or y services, x and y being determined by a service provider or connected and parameterizable objects. Thus, if the determination of the profiles indicates that a connected object Cox-i is used by a large majority of the second access gateways, then the configuration information is a proposal to purchase this object Cox-i.

During the determination of the profile of the first access gateway, if the profile shows that a connected object COy-i is not used, then the configuration information can also be an exchange of the object COy-i by the object Cox-i.

In some embodiments, it is possible to select only the use data of some access gateways based for example on the personal data. The personal data associated with the second access gateways are compared with the personal data associated with the first access gateway and only the second access gateways whose personal data are similar to the personal data associated with the first access gateway are kept to determine the operating data. By similar it is possible to imagine keeping only the second access gateways whose age data are less or more than 5 years more or less. It is also possible to imagine keeping the second access gateways whose composition of an associated family home is similar in number of children.

Preferably, the information on the configuration of the environment consists of information on the modification of the connected objects and/or services present in the environment, said modification consisting of a deletion, a replacement, a purchase, a subscription, a parameterization of one or several connected objects and/or services.

More specifically, the configuration information may represent one or more of:

- information on the parameterization of a connected object,
- information on the modification of the parameterization of a connected object,
- information on the parameterization of a service,
- information on the modification of the parameterization of a service,
- a proposal to purchase a new connected object,
- a proposal to rent a new connected object,
- a proposal to replace a connected object with a new connected object,
- a proposal to subscribe to a new service,
- a proposal to stop subscribing to a service,
- a proposal to replace one service with another.

Thus, for example, if the determination of the profiles of the second access gateways shows that a connected object Cox-i is configured in the majority of cases in a given configuration, information on the parameterization of the connected object Cox-i, accessible by the first access gateway in said given configuration will be transmitted to the first access gateway.

The transmission of configuration information consists of the transmission of a message including said configuration information relating to the environment of the user, that is to say to at least one object, and/or at least one service and/or the configuration of said at least one object and/or said at least one service.

After the configuration information is received by the first access gateway, it is presented to a user according to one preferred embodiment, through a user interface. According to one variant, it can also be implemented automatically by transmission of a command from the access gateway to a connected object when it is a modification of the configuration of a connected object.

Steps E2 to E12 constitute one embodiment of the method implemented by the server 2. In one embodiment, the access gateways are organized into clusters according to their profile. In general, these steps allow determining the profiles of the other access gateways of the system and selecting part of some access gateways. These steps can allow more precisely selecting relevant communication interface profiles in order to refine the configuration information also called recommendations.

In general, steps E2 to E12 represent steps that allow determining, according to one preferred embodiment, the profile of a plurality of communication interfaces or access gateways.

The access gateway profiles are registered in the database 3, step E2. These profiles are created during the subscription and then updated on a regular basis, with each change affecting the environment of a subscriber for example.

The method then comprises the selection of a subscriber for whom it is wished to check the relevance of the environment, step E3. The method can thus be repeated for each user/subscriber or according to the type of subscriber to be targeted, which can also be related to the profile. This user/subscriber is called target user or target subscriber in the remainder of the description.

The method comprises a step E4 of selecting a set of profiles. This step can allow limiting the set of profiles used and thus when the database comprises many users, therefore many access gateways, for example several thousands, reducing the times of execution of the method. This can also allow not taking into consideration certain profiles from the outset because they are not relevant.

According to one embodiment, this selection can advantageously be made based on the personal data of the users associated with the access gateways.

The selection can for example take into account an age group to which the target user belongs and select all the users from this age group. Thus, a home composed of people with young children may not be taken into consideration from the outset if the method more particularly aims recommendations targeted at services or objects related to the elderly.

According to another variant, which can be combined with a selection per age group, the selection can also take into account the geographical location. This turns out to be relevant for heating or air conditioning services.

According to a third variant, which is also combinable, the selection can take into account the family profile, namely the number of children for example.

According to a fourth variant, this selection can be also advantageously made based on the use or operating data.

During a step E5, the profiles of the selected access gateways are formatted. To do so, the profiles are vectorized.

Each profile Pi is represented in the form of a vector such that:

$$Pi=(\alpha i_1,\alpha i_2,\alpha i_3, \ldots, \alpha i_n) \quad \text{Equation 1}$$

Each element of the vector Pi corresponds to a service or a connected object. Each coefficient $\alpha i$ represents a weighting associated with the service or with the connected object depending on the use made of the service or of the connected object. The higher the coefficient $\alpha i$, the more the service or the corresponding connected object is used or in operation. More specifically, to take into account the associated configurations, each element of the vector can be associated with a configuration of a service or with a configuration of a connected object. The number of services, connected objects and configuration taken into account is determined as well as the length of the corresponding vector.

In one particular embodiment, it is envisaged that the method does not take into consideration all the configurations of all the services and connected objects available but is limited to a lower number. This may be particularly the case when the access provider wishes to build the recommendations on some services or connected objects only.

During a step E6, the profiles are clustered according to the profiles formatted during the step E5. To do so, according to one preferred embodiment, the method uses a clustering algorithm such as the algorithm of the k-means. This algorithm clusters the access gateways whose profiles are similar. K-means is an unsupervised non-hierarchical clustering algorithm. It allows clustering the profiles into K distinct clusters. Thus, the similar profiles are found in the same cluster. Moreover, an observation can only be found in one cluster at a time (exclusivity of membership). The same observation therefore cannot belong to two different clusters.

To be able to cluster the profiles into K distinct clusters, the K-Means algorithm needs a way to compare the degree of similarity between the different profiles. Thus, two similar data have a reduced dissimilarity distance, while two different objects have a greater separation distance. Several notions of distance are used in the literature and in particular the Euclidean distance and the Manhattan distance.

Preferably, the distance used is the Euclidean distance.

The Euclidean distance between two profiles Pi and Pj is therefore given by the formula:

$$d(Pi, Pj) = \sqrt{\sum_{1}^{n} (\alpha i_n - \alpha j_n)^2} \quad \text{Equation 2}$$

The K-means algorithm allows obtaining the optimal number of clusters. To do so, the K-Means algorithm is applied with different values of K and then the variance of the different clusters is calculated. The variance is the sum of the distances between each centroid of a cluster and the different values included in the same clusters. Thus, it is sought to find a number of clusters K such that the retained clusters minimize the distance between their centers (centroids) and the values in the same cluster. These methods for obtaining the optimal number of clusters are well known to those skilled in the art and are not detailed here. K refers to the number of clusters obtained at the end of the K-means algorithm of step E6.

The method comprises a step E7 in which the profile of the target access gateway, or first access gateway, is compared with each cluster of communication interfaces among the K clusters. To do so, the method comprises the calculation, for example, of the center of each cluster, by averaging, according to one preferred embodiment, the coordinates of the vectors. The method measures the distance (for example Euclidean distance) between the center obtained for each cluster and the vector representative of the target gateway.

During a step E8, the method comprises the selection of a subset L of clusters as a function of their distance from the target access gateway. The number L of clusters can be parameterized, the method can for example decide to select 3 clusters, namely the 3 clusters whose profile distance with the profile of the target access gateway is the lowest. According to another embodiment, the method can comprise the selection of the clusters whose distance with the profile of the target access gateway is below a threshold. According to another embodiment, the two approaches can be combined.

FIG. 5 illustrates one preferred embodiment in which three clusters are selected. For each of the clusters 1, 2 and 3, the services and the connected objects are listed. The services are numbered 1 to n and the connected objects are also named 1 to m. Each row corresponds to a configuration of a service or a connected object. Each row is mentioned in each list because the list comprises all the service configurations and connected objects made possible by the service provider. This is particularly useful for identifying, for example, the launch of a new service or a new connected object. In this case, it is generally not in operation and it may be useful to see whether a service or connected object is not used if it is a newly accessible service or connected object. Thus, the lists can for example comprise an additional indicator for each service on the launch date or on the time during which the service/the connected object has been in service.

For each of the entries in each of the lists, the column 1 identifies the service or connected object. The column 2 indicates the number of access gateways in each cluster that uses the service or the connected object. The column 3 comprises an indicator representative of the operating time or use frequency of the connected object or service. The figure in column 3 is compiled based on the number of access gateways and either on the use frequency or on the use time. Several methods can be used to obtain this indicator.

If the indicator is representative of an operating time, the indicator can for example be obtained by calculating an average of the operating time if the operating time of each user of the cluster is obtained by summing the time and dividing by the number of access gateways.

If the indicator is representative of a use frequency, the indicator can in the same way be obtained by calculating an average of the use frequency if the use frequency of each user of the cluster is obtained by summing the frequency and dividing by the number of users.

In FIG. 5, it can therefore be observed for example that three access gateways associated with three users of the cluster 1 use the service S1 and on average they use it 5 hours per day, if the column D represents an operating time in hours. Similarly, seven users associated with seven access gateways of the cluster 3 use the service S1 and on average they use it 8 hours per day.

The method comprises a step E9 in which the profiles of the access gateways of the L clusters selected during step E8 are analyzed, listed and aggregated. The aim of this step is to cluster the three previous clusters into a single list by adding the data for each service/connected object. It is recalled that these clusters of access gateways are selected as being access gateways whose profile is similar to that of the target access gateway, the proximity having been established during the previous steps. These profiles describe the environment of the users and therefore the services, the connected objects and the configurations associated with these services and these connected objects actually used by the users. The method comprises the establishment of a global list of the services, connected objects and configurations used by each of the access gateways, or of the users associated with these access gateways, of these selected clusters with, for each one, the number of access gateways using them, the operating time or the use frequency. As illustrated above, the operating time or the use frequency preferably constitute weightings associated with each of the service configurations or connected objects. Such a list is for example illustrated in FIG. 6.

FIG. 6 represents a list, on the left, established from the lists in FIG. 5 and a list, on the right, comprising the list of the services and connected objects used by the target user. The list on the left comprises, for each row, therefore for each object or service referenced in the left column, the corresponding sum of the middle and right columns of the three lists in FIG. 5. Not all the connected services and objects are present in each list. The list on the left comprises all the services present in at least one of the clusters. The list on the right also comprises three columns. The first column identifies the service or the connected object as in the other lists. The column in the center indicates an operating time or a use frequency. The column on the right entitled "REFUSAL" gives an additional indication relating to a recommendation to the target access gateway that the method would have made previously. Indeed, it is sometimes useless to repeatedly offer a user a service that he has already refused on one or several occasions. In one variant, the list could contain a fourth column, not represented in FIG. 6, indicating the number of refusals. Indeed, if a user has refused the service once, he may, several months later for example, be finally interested in accepting the recommendation. Advantageously, the date of the refusal could also be added.

During a step E10, the method comprises the comparison of this list with the list of the services, connected objects and used configurations of the target access gateway and deletes from the global list the used services, connected objects in operation and used configurations by the target access gateway. This global list therefore only contains the services, connected objects and associated configurations that are not used or in operation, through the target access gateway. This allows then not offering services, connected objects and used configurations that have already been used.

According to one embodiment, the list can also exclude the objects and/or services that have been previously refused following a previous receipt of configuration information or recommendation. More specifically, only the objects and/or services that have been refused multiple times are excluded. Even more, the date on which they have been refused can be taken into account for them to be excluded or not.

During a step E11, the method comprises the evaluation, for each service, of the connected objects and used configurations, of the cost incurred for the target access gateway for the acquisition of one of the services, connected objects and configurations in the list. The cost can be a financial cost, and can correspond to the cost of subscription to a new service, to the cost of purchase or rental of a connected object or to the cost of modification of a configuration. In general, the cost of modification of a configuration is zero or almost zero.

As mentioned previously, there is not a two-way relationship between services and connected objects and thus, the method comprises the evaluation not only of a cost per subscribed service but comprises the determination of a cost for the service SA with the connected object SA in the configuration CA but also for the service SA with the connected objects SA and SB in the configuration CA. Thus, many combinations are possible and depend on the service operator with which the subscriber has taken out his contract.

During a step E12, the list is ordered from the lowest cost to the highest cost. This list constitutes a list of recommendations for changing the environment of the target user. It should be noted that, in addition to the financial costs, the list can also be ordered by prioritizing the minimum configuration changes. For example, the user may have the service but not the connected object, it is sometimes easier for him to purchase or rent a new connected object rather than to undertake to take out a new service over a long period. The ordering of the list can therefore follow different strategies or at least the notion of cost can be related to different costs.

FIG. 7 represents an example of such a list ordered according to the cost. The left column comprises an example of a list representative of the configuration information. In this column, connected objects, services (S3) and a combination of connected objects and services (Sn+Om) are listed. Then, the configuration information is classified according to a calculated associated cost. The cost can for example be a financial cost and represent, depending on the configuration, a cost of subscription, rental or purchase; this is what is indicated in the right column. In other embodiments, the cost may be zero, in financial terms, because it can comprise a simple change of configuration or a replacement of one object with another and in this case, be financially advantageous for the user. He may indeed be offered to replace an expensive but unused connected object with a less expensive but more useful connected object. In this case, the cost can be represented, for example, by the number of objects to be changed, by the complexity of the service to be set up (coming of a technician for example). The service provider can also make a selection among several costs or combine them to propose configuration information adapted to the user. This may possibly be related to the personal data of the user.

This list allows quickly generating the configuration information. According to the service operator linked to the server 2, it can generate the configuration information by selecting part of the information present in the left column of the list represented in FIG. 7. For example, it can decide to propose the first three least expensive configurations.

According to another embodiment, it can select the 5 or 10, even the n configurations whose cost is below a given threshold.

For example, the configuration information therefore consists of one or several services or connected objects or parameterizations, directly extracted from the list proposed in FIG. 7. It is enriched with the information generated from the information associated with the profile of the user. Considering the list of FIG. 7, the service S3 is determined as being the service most suited to the user, it is proposed to the user of the first access gateway. Thus, the configuration information comprises information on the subscription to the service S3.

If the user of the first access gateway has subscribed to a service Sx but the determination of his profile shows that he does not use the service Sx, then the configuration information may consist of a replacement of the service Sx with the service S3.

Thus, the configuration information is based on the profile associated with the second access gateways and on the profile associated with the first access gateway, the profile being mainly based on the operating information.

In this example, a message is prepared, listing these three configurations or even the cost associated for the user and transmitting this information to the first access gateway.

During a step E13, the method comprises the transmission to the target access gateway of information on the configuration of the environment in the form of one or several recommendations for modifying its environment. This can be transmitted by the server 2 to the communication interface 101-*k* of the target user k. This information can for example be displayed in a client account associated with the target user or transmitted to him by other modes of communication, such as voice messages or telephone calls. This can also be proposed to the user when he requests on his own initiative a client service associated with the operator.

The configuration information, already described and listed above, can take the form of a list of services, connected objects or both, alone or in combination. The configuration information can also comprise information relating to the setting up of said services and connected objects. This means, for example, a user guide to promote the commissioning. The configuration information can also comprise information on the replacement of one object with another. The configuration information can comprise information on the purchase of one or several connected objects or on the subscription to one or several services. The accepted recommendations are generally implemented by the user but can also be implemented automatically by commands coming from the server 2 and transmitted to the connected objects via the access gateway.

During a step E14, the target access gateway transmits information on the acceptance or refusal of the recommendation to the server 2 then the profile of the target access gateway is updated according to the accepted or refused recommendations. This advantageously allows, according to one variant, withdrawing, during the next recommendation, the refused suggestions. This refusal information can be taken into account during step E4. This step E4 indeed allows reducing the starting set of the profiles. The access gateways mainly using services refused by the target access gateway can thus be advantageously removed from the access gateways used during step E4. According to another variant, this refusal information can be taken into account during step E10 not only to avoid offering the user, via his access gateway, services that he already has as mentioned previously but also services that he would have refused during a previous recommendation.

According to another variant, this refusal information can be taken into account in one of the steps E12 and E13 by being withdrawn during step E12 or by not being proposed during step E13.

Of course, but this is not the object of the present disclosure, following receipt of the configuration information, the user will be able to read it by means of a user interface and also accept or refuse the services by means of a user interface. Thus, refusal or acceptance messages are transmitted to the server. Then a step of configuring the services or connected objects will allow modifying the environment of the user.

What is claimed is:

1. A method for transmitting information on a configuration of a first system comprising at least one first connected object and implementing at least one first service accessible through a first access gateway that allows connecting said first system to a service operator, said method being implemented by said service operator and comprising:

determination of an operation of at least one second connected object or of the implementation of at least one second service of a second system, accessible through at least one second access gateway different from the first access gateway and allowing connecting said second system to said service operator, and transmission, by said service operator, to said first access gateway of information on the configuration of said first system accessible by said first access gateway, said configuration information being determined as a function of the operation of said at least one second connected object or of the implementation of said at least second service in said second system, said configuration information of said first system comprising information on a modification of at least a first connected object or the first service, said modification comprising a parameterization of at least the first connected object or a parameterization of said first service or a parameterization of both, wherein said determination of the operation of at least one second connected object takes into account an operating time or a use frequency of said second connected object.

2. The method of claim 1, wherein said at least one first and at least one second connected objects are associated with at least one configuration, said determination of the operation takes into account an operating time or a use frequency of the second connected object associated with at least one of said configurations.

3. The method of claim 1, wherein said at least one first and at least one second connected objects configured in at least one of said configurations are accessible by a subscription to at least one of said services, or wherein at least one service can be subscribed via respectively said first or second access gateways, said determination of the operation taking into account an operating time or a use frequency associated with said subscribed services.

4. The method of claim 1, wherein the method further comprises determination of a profile associated with said first access gateway and the determination of a profile associated with said at least one second access gateway, said determination of a profile associated with said first access gateway, respectively with said second access gateway, taking into account:

connected objects that are connected to said first access gateway, respectively to said second access gateway, a configuration of said objects connected to said first access gateway, respectively to said second access gateway, subscribed services via said first access gateway, respectively via said second access gateway, and an operating time or a use frequency associated with the subscribed services and/or an operating time or a use frequency of the connected objects associated with at least one of said configurations.

5. The method according to claim 4, wherein the method further comprises:

clustering, into several clusters, of said profiles associated with the second communication interfaces, the clustering being based on a similarity between said profiles, and obtaining of a distance between the profile associated with said first communication interface and a profile representative of said at least one clustering, said configuration information taking into account the profile representative of said at least one clustering as a function of said distance.

6. The method of claim 5, wherein the method further comprises the selection of one or several clusterings of profiles, the selection consisting in selecting the profile whose said distance with the profile of said first interface communication is the smallest, said modification information taking into account the profile of said communication interfaces of at least said selected clusterings.

7. The method of claim 6, wherein the method further comprises a classification, for the clusterings of selected profiles, of the connected objects in operation, of the subscribed services, of the configuration used for said connected object in operation, said connected objects being associated with a type of connected objects, said classification being based on at least one parameter selected from the group comprising:

a number of communication interfaces each connected to one of said types of connected objects or the number of communication interfaces for which at least one of said services is subscribed, and the operating time or the use frequency of said service or of said type of connected objects in one of said configurations, said classification not comprising said types of connected objects used in the operating configurations accessible by said first communication interface, nor said subscribed services accessible by said first communication interface.

8. The method of claim 7, wherein the method further comprises, for at least one determined number of subscribed services and/or types of connected objects present in said classification, determination of a cost associated with the implementation of said services or said types of connected objects in said configurations.

9. The method of claim 8, wherein said configuration information comprises a list of services, and/or types of connected objects and associated configurations selected according to said determined cost.

10. A non-transitory storage medium having stored thereon a computer program, the computer program comprising instructions which, when executed by a computer, cause the computer to execute the steps of the method of claim 1.

11. A non-transitory computer-readable recording medium having stored thereon instructions which, when executed by a processor, cause the processor to implement the steps of the method of claim 1.

12. The method of claim 1 wherein the configuration information represents one or more of:

information on the parameterization of the at least one second connected object, information on the modification of the parameterization of the at least one second connected object, information on the parameterization of the at least one second service, information on the modification of the parameterization of the at least one second service, a proposal to purchase a second connected object in addition to the at least one second connected object, a proposal to rent a second connected object in addition to the at least one second connected object, a proposal to replace a connected object with a connected object different from the at least one second connected object, a proposal to subscribe to a service different from the at least one second service, a proposal to stop subscribing to the at least one second service, a proposal to replace one at least one second service with another service.

13. A device for transmitting information on the configuration of a first system comprising at least one first connected object and implementing at least one first service accessible through a first access gateway that allows connecting said first system to said device, said device comprising one or several processors configured to:

determine an operation of at least one other connected object or the implementation of at least one second service accessible through at least one second access gateway different from the first access gateway and that allows connecting said second system to said device, transmit, to said first access gateway, information on the configuration of said first system accessible by said first access gateway, said configuration information being determined as a function of said operation of said at least second connected object or of the implementation of said at least second service in said second system, said configuration information of said first system being a parameterization of at least a first connected object or a parameterization of said first service or a parameterization of both, wherein determining of the operation of at least one second connected object takes into account an operating time or a use frequency of said second connected object.

14. An access gateway for connecting a first system to a service operator, the first system comprising at least one first connected object and implementing at least one first service, said service operator being connected to at least one second system through a second access gateway, said second system comprising at least one second connected object and implementing at least one second service, said access gateway being configured to receive, from said service operator, at least one configuration information on the configuration of said first system, said configuration information being determined as a function of the operation of said at least second connected object or of the implementation of said at least second service in said second system and takes into account an operating time or a use frequency of said second connected object, said at least one configuration information comprising information on a modification of at least a first connected object or the first service, said modification comprising a parameterization of at least the first connected object or a parameterization of said first service or a parameterization of both.

15. A connected object in a system comprising one or several connected objects, an access gateway and implementing at least one first service, said system being connected to a service operator through said first access gateway, said service operator being connected to at least one second system through a second access gateway, said second system comprising at least one second connected object and implementing at least one second service, said connected object being configured to receive, from said service operator, through said first access gateway, at least one configuration information, said configuration information being determined as a function of the operation of said at least second connected object or of the implementation of said at least second service in said second system and takes into account an operating time or a use frequency of said second connected object, said configuration information of said first system comprising information on a modification of at least a first connected object or the first service, said modification comprising a parameterization of at least the first connected object or a parameterization of said first service or a parameterization of both.

16. A method for recommending a modification of an environment of a first user, said environment comprising at least one first connected object and implementing at least one first service accessible through a communication interface, said method being implemented by a computer and comprising:

determining an operation of at least one second connected object or the implementation of at least one second service accessible through at least one second communication interface different from the first communication interface, wherein said determining of the operation of at least one second connected object takes into account an operating time or a use frequency of said second connected object, and recommending to said first communication interface to modify the configuration of said environment accessible by said first communication interface as a function of said operation, said configuration of said first system being a parameterization of at least a first connected object or a parameterization of said first service or a parameterization of both.

17. The method of claim 16, wherein said recommending comprises a proposal to replace or purchase one or several connected objects, or a proposal to subscribe to or unsubscribe from one or several services.

18. The method of claim 16, wherein said at least one first and at least one second connected objects are associated with at least one configuration, said determining of the operation taking into account an operating time or a use frequency of the second connected object associated with at least one of said configurations.

* * * * *